United States Patent
Tsunekawa et al.

(10) Patent No.: US 6,746,369 B2
(45) Date of Patent: Jun. 8, 2004

(54) CONTROL DEVICE OF A LOCK-UP MECHANISM

(75) Inventors: Kazutoshi Tsunekawa, Kariya (JP); Yuuki Ohta, Okazaki (JP); Keisuke Kurokawa, Tajimi (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/966,072

(22) Filed: Oct. 1, 2001

(65) Prior Publication Data

US 2002/0040622 A1 Apr. 11, 2002

(30) Foreign Application Priority Data

Sep. 29, 2000 (JP) .................................... 2000-300018

(51) Int. Cl.[7] ............................................... B60K 41/22
(52) U.S. Cl. .................. 477/176; 477/168; 477/180
(58) Field of Search ........................... 477/166, 168, 477/174, 175, 176, 180

(56) References Cited

U.S. PATENT DOCUMENTS

| | | | | |
|---|---|---|---|---|
| 5,085,301 A | * | 2/1992 | Imamura et al. | 477/176 X |
| 5,653,661 A | * | 8/1997 | Kato et al. | 477/176 |
| 5,683,329 A | | 11/1997 | Kono et al. | |
| 5,697,867 A | * | 12/1997 | Kono et al. | 477/176 |
| 5,807,209 A | * | 9/1998 | Matsubara et al. | 477/176 |
| 6,050,919 A | * | 4/2000 | Kusafuka et al. | 477/176 |

FOREIGN PATENT DOCUMENTS

| | | | | |
|---|---|---|---|---|
| JP | 357160731 | * | 10/1982 | 477/176 |
| JP | 405180331 | * | 7/1993 | 477/176 |
| JP | 8-28681 A | | 2/1996 | |

* cited by examiner

Primary Examiner—Ha Ho
(74) Attorney, Agent, or Firm—Burns, Doane, Swecker & Mathis, L.L.P.

(57) ABSTRACT

A control device for a lock-up mechanism arranged parallel with a hydraulic type torque transmitting mechanism that transmits rotatory power of a pump impeller connected with an output shaft of an engine to a turbine impeller connected with a wheel side element. The lock-up mechanism controls a slip value between the rotational speeds of the pump and turbine impellers in response to supplied hydraulic pressure. The control device calculates a target slip value, detects an actual slip value based on the rotational speed difference of the pump and turbine impellers, sets an intermediate slip value between the actual and target slip values, controls the hydraulic pressure to the lock-up mechanism so that the actual and intermediate slip values coincide, and reduces the intermediate slip value to a renewed value closer to the target slip value than the intermediate slip value when the actual slip value reaches the intermediate slip value.

4 Claims, 6 Drawing Sheets

CONTROL DEVICE OF A LOCK-UP MECHANISM

This application is based on and claims priority under 35 U.S.C. § 119 with respect to Japanese Patent Application No. 2000-300018 filed on Sep. 29, 2000, the entire content of which is incorporated herein by reference.

FIELD OF THE INVENTION

This invention generally relates to a torque converter associated with a vehicle transmission. More particularly, the present invention pertains to a control device of a lock-up mechanism in a torque converter of a vehicle for controlling the slip value defined as the difference between the rotation speed of a pump impeller connected to the engine and the rotation speed of a turbine impeller connected to a wheel side element.

BACKGROUND OF THE INVENTION

Generally speaking, a lock-up mechanism used in the torque converter of a vehicle controls the slip value between the rotation speed of the pump impeller and the rotation speed of the turbine impeller by controlling the force applied to a piston while controlling the hydraulic pressure into the torque converter.

A Japanese patent application published as Toku-Kai-Hei 8(1996)-28681 discloses a control device of a lock-up mechanism which controls the slip value of the pump impeller and the turbine impeller. This control device controls the actual slip value so that it coincides with a transient target slip value, so that the actual slip value approaches a target slip value gently. More specifically, the control device calculates the target slip value (fixed value) based on a driving condition of the vehicle and sets an initial value of the transient target value based on the actual slip value immediately before operation of this device is initiated. The transient target slip value is reduced toward the target slip value by a predetermined decrement which decreases gradually as the transient target slip value approached the target slip value as shown in FIG. 14 of the published application. Accordingly, the actual slip value approaches the target slip value gently.

However, situations arise in which the actual slip value overshoots the target slip value because the transient target slip value is uniformly reduced by the predetermined decrement independently of the dispersion of the target slip value calculated based on varied driving condition of the vehicle. This occurrence of the overshoot deteriorates the drivability of the vehicle.

A need thus exists for a vehicle lock-up mechanism control device which is not as susceptible to the same disadvantages and drawbacks as those mentioned above.

SUMMARY OF THE INVENTION

To achieve the aforementioned object the following technical means is provided with a control device of a lock-up mechanism includes the lock-up mechanism arranged in parallel with a hydraulic type torque transmitting mechanism transmitting a rotatory power of a pump impeller connected with an output shaft of an engine to a turbine impeller connected with a wheel side element, the lock-up mechanism controlling a slip value between a rotational speed of the pump impeller and a rotational speed of the turbine impeller in response to a hydraulic pressure supplied thereto, a target slip value calculating means for calculating a target slip value based on driving condition of a vehicle, an actual slip value detecting means for detecting an actual slip value from the difference between the rotational speed of the pump impeller and the rotational speed of the turbine impeller, an intermediate slip value setting means for setting an intermediate slip value between the actual slip value and the target slip value, a hydraulic pressure controlling means for controlling the hydraulic pressure supplied to the lock-up mechanism in order for the actual slip value to coincide with the intermediate slip value, and an intermediate slip value renewal means for reducing the intermediate slip value to a renewed value closer to the target slip value than the intermediate slip value when the actual slip value reaches the intermediate slip value.

According to this invention, the intermediate slip value is set between the actual slip value and the target slip value. Namely, the intermediate slip value is certainly set at a slip value larger than the target slip value. It is thus possible to control the actual slip value so as not to overshoot the target slip value.

Another aspect of the invention involves a method for controlling a lock-up mechanism arranged in parallel with a hydraulic type torque transmitting mechanism that transmits rotatory power of a pump impeller connected with an output shaft of an engine to a turbine impeller connected with a wheel side element, with the lock-up mechanism controlling a slip value between a rotational speed of the pump impeller and a rotational speed of the turbine impeller in response to hydraulic pressure supplied to the lock-up mechanism. The method includes calculating a target slip value based on driving conditions of a vehicle, detecting an actual slip value between the rotational speed of the pump impeller and the rotational speed of the turbine impeller based on the difference between the rotational speed of the pump impeller and the rotational speed of the turbine impeller, setting an intermediate slip value between the actual slip value and the target slip value, controlling hydraulic pressure supplied to the lock-up mechanism to cause the actual slip value to approach the intermediate slip value, and reducing the intermediate slip value to a renewed value closer to the target slip value than the intermediate slip value when the actual slip value reaches the intermediate slip value.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
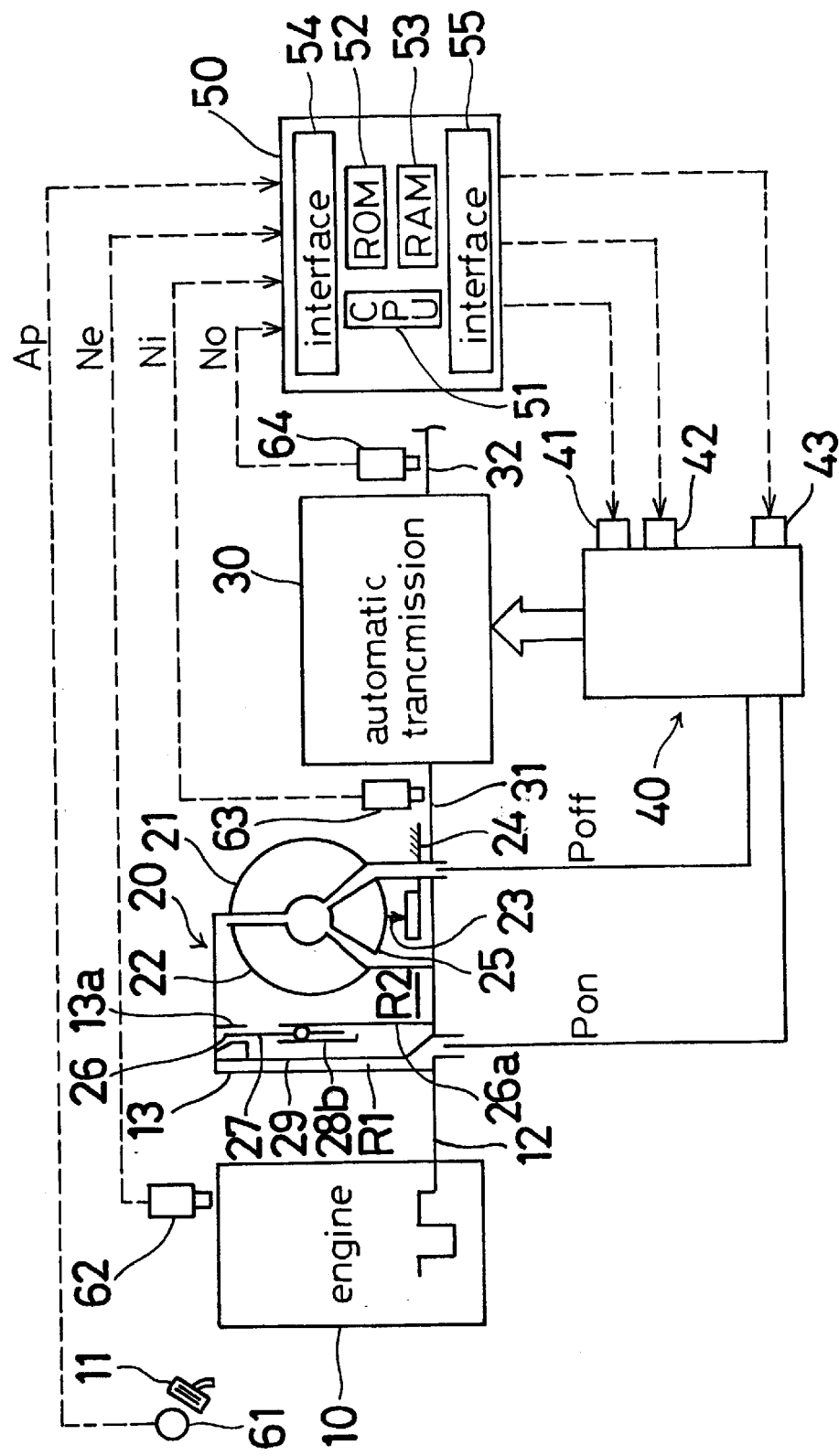
FIG. 1 is a schematic system diagram of an automatic transmission including a control device of a lock-up mechanism according to the present invention.

Referring initially to FIG. 1 which schematically illustrates an automatic transmission including the control device of a lock-up mechanism according to an embodiment of the present invention, the automatic transmission is carried in a vehicle. This vehicle has an engine 10 and a torque converter 20 having a lock-up mechanism. The automatic transmission 30 is composed of a plurality of planetary gear sets, a hydraulic pressure control circuit 40 and a electric control circuit 50. The driving force from the engine 10 is changed by stepping on or pressing an accelerator pedal 11 and is transmitted to an axle shaft through the torque converter 20, the automatic transmission 30 and a differential gear.

The torque converter 20 has a hydraulic type torque transmitting mechanism and the lock-up mechanism. The hydraulic type torque transmitting mechanism has a pump impeller 21 connected with a crankshaft 12 through a connecting element 13 including a front cover of the torque converter 20, a turbine impeller 22 fixed with an input shaft 31 of the automatic transmission 30 and rotating by receiving hydraulic pressure from the pump impeller 21, and a stator impeller 25 fixed with a housing 24 through a one-way clutch 23. The connecting element 13 is connected with the pump impeller 21 so is to rotate integrally with an output of the engine 10 (the crankshaft 12), and the input shaft 31 is connected with the turbine impeller 22 so as to rotate integrally with the axle shaft.

Figure 2:
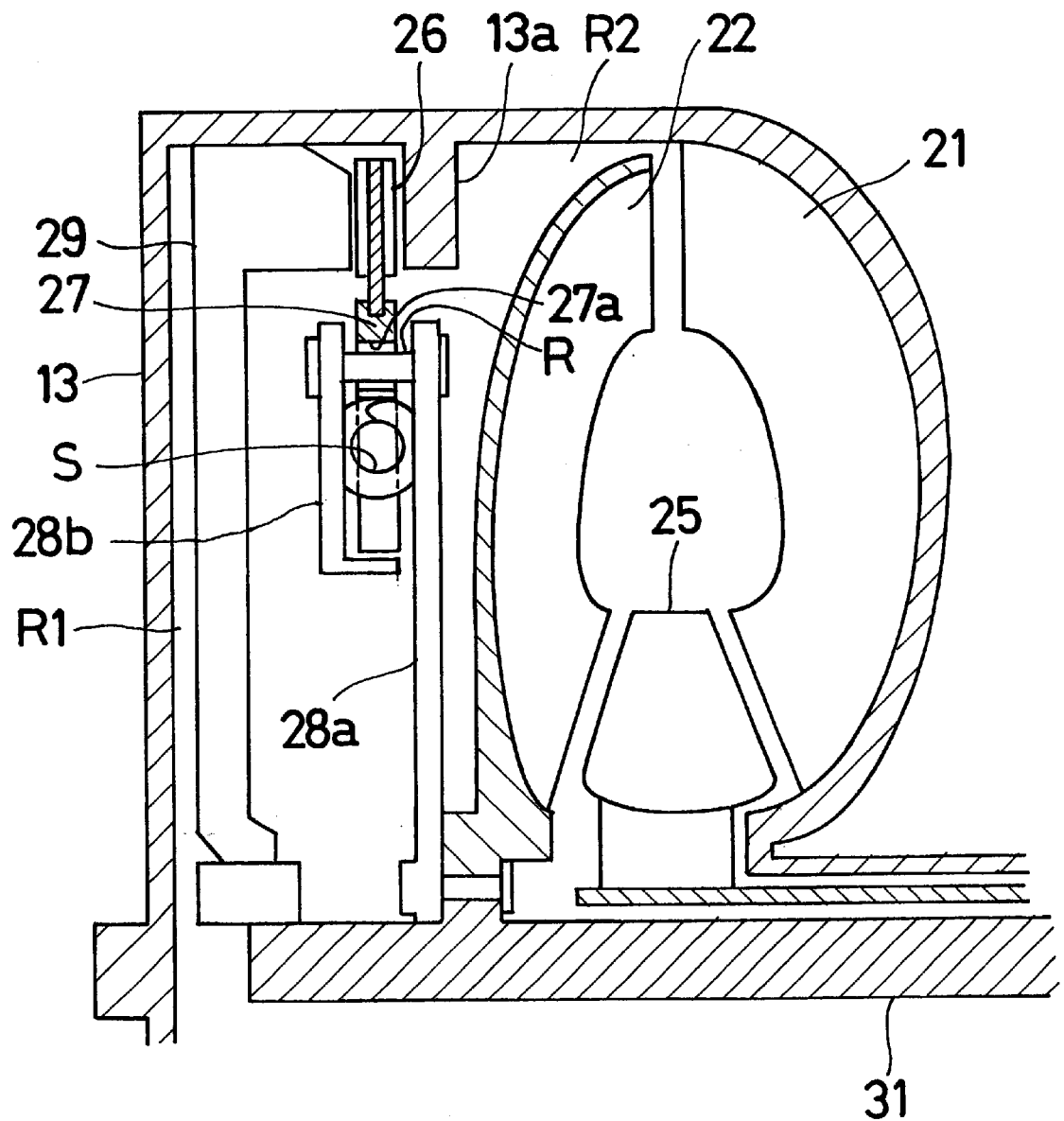
FIG. 2 is a side view of the lock-up mechanism shown in FIG. 1.

As shown in FIG. 2, the lock-up mechanism has a ring shaped lock-up clutch 26 supported to move in the axial direction and having frictional plates at both surfaces, a ring shaped driving plate 27 fixed to the inside portion of the lock-up clutch 26, an opposite portion 13a formed from part of the connecting element 13 in order to be opposite the lock-up clutch 26, a first driven plate 28a fixed to the input shaft 31 so as to rotate with the input shaft 31 of the automatic transmission 30, a ring shaped second driven plate 28b fixed to the first driven plate 28a by a rivet R (shown in FIG. 2), a lock-up piston 29 that is able to move in the axial direction for pressing the lock-up clutch 26 to the opposite portion 13a, and a plurality of coil spring S (one of which is shown in FIG. 2).

The coil springs S function as a damper mechanism for absorbing torque fluctuation. The coil springs S are supported in oblong holes formed at appropriate places of the first driven plate 28a and the second driven plate 28b. Accordingly, the coil springs S generate impact resilience between the driving plate 27 (the lock-up clutch 26) and the first driven plate 28a (the second driven plate 28b) when relative rotation is generated between the driving plate 27 and the first driven plate 28a.

The lock-up piston 29 presses the lock-up clutch 26 toward the opposite portion 13a when hydraulic pressure in an engaging side chamber R1 formed by the lock-up piston 29 and the connecting element 13 becomes larger than the hydraulic pressure in a release side chamber R2 formed by the lock-up clutch 26 and the first driven plate 28a. The lock-up clutch 26 is thus engaged with the opposite portion 13a. When the hydraulic pressure in the release side chamber R2 becomes larger than the hydraulic pressure in the engaging side chamber R1, the lock-up piston 29 releases the lock-up clutch 26 from the opposite portion 13a. The lock-up clutch 26 is thus disengaged from the opposite portion 13a.

The automatic transmission 30 has the input shaft 31 and an output shaft 32 connected with a drive wheel of the vehicle via a differential. The automatic transmission 30 also includes a planetary gear drive, whereby one of a plurality of gear stages is performed or achieved by way of different combinations of engaged and/or disengaged conditions of a plurality of hydraulic type frictional clutches, with the output shaft 32 being driven by the input shaft 31 via a selected gear stage.

The hydraulic pressure control circuit 40 has a first solenoid valve 41 and a second solenoid valve 42 which are either excited (energized) or not based on signals from the electric control circuit 50. The hydraulic type frictional clutches of the automatic transmission 30 are selectively engaged or disengaged with respect to the combinations of the excited (energized) or non-excited (non-energized) conditions of the solenoid valves 41 and 42.

The hydraulic pressure control circuit 40 also has a third solenoid valve 43 for regulating the hydraulic pressure Pon supplied to the engaging side chamber R1 and the hydraulic pressure Poff supplied to the release side chamber R2. The hydraulic pressures Pon and Poff are used for controlling the engaging condition of the lock-up clutch 26 and the opposite portion 13a. Namely, a slip value of the pump impellers 21 and the turbine impellers 22 is controlled by the hydraulic pressures Pon and Poff. The third solenoid valve 43 is a linear solenoid valve, and the duty ratio of the current is controlled by signals from the electric control circuit 50. The third solenoid valve 43 controls the line pressure of the hydraulic pressure control circuit 40, with the controlled line pressure by the solenoid valve 43 being supplied into the engaging side chamber R1. Furthermore, the hydraulic pressure control circuit 40 supplies a constant hydraulic pressure into the release side chamber R2 when the third solenoid valve 43 is in the duty controlled condition, and drains the hydraulic pressure in the release side chamber R2 when the third solenoid valve 43 is not in the duty controlled condition. The differential between the hydraulic pressure in the engaging side chamber R1 and the hydraulic pressure in the release side chamber R2 is the engaging pressure of the lock-up clutch 26.

The electric control circuit 50 is a microcomputer having a CPU (Central Processing Unit) 51, ROM (Read Only Memory) 52, RAM (Random Access Memory) 53 and interfaces 54, 55. The electric control circuit 50 is connected to an accelerator stroke sensor 61 for detecting a stroke of the accelerator pedal 11, an engine rotation speed sensor 62 for detecting a rotation speed of the engine 10, an input shaft rotation speed sensor 63 for detecting a rotation speed of the input shaft 31 and an output shaft rotation speed sensor 64 for detecting a rotation speed of the output shaft 32. The electric control circuit 50 is inputted with a signal Ap indicative of the stroke of the accelerator pedal 11, a signal Ne indicative of the rotation speed of the engine 10 (equal to the rotation speed of the pump impeller 21), a signal Ni indicative of the rotation speed of the input shaft 31 (equal to the rotation speed of the turbine impeller 22) and a signal No indicative of the rotation speed of the output shaft 32 from the sensors 61, 62, 63, 64 mentioned above.

The CPU 51 of the electric control circuit 50 processes each of the above signals based on a program memorized in the ROM 52 utilizing the memory function of the RAM 53, and performs a shift control of the automatic transmission 30 and an engaging control of the lock-up clutch 26. In these controls, the excited or energized conditions of the solenoid valves 41, 42, 43 are controlled via an interface 55.

In the shift control of the automatic transmission 30, the CPU 51 selects one shift map corresponding to an actual shift stage from a plurality of shift maps. The CPU 51 decides a target shift stage based on the stroke of the accelerator pedal 11 and a vehicle speed SPD obtained from the rotation speed of the output shaft 32 by using the selected shift map. The shift stage is changed to the target shift stage by controlling the operation of the solenoid valves 41, 42.

Figure 3:
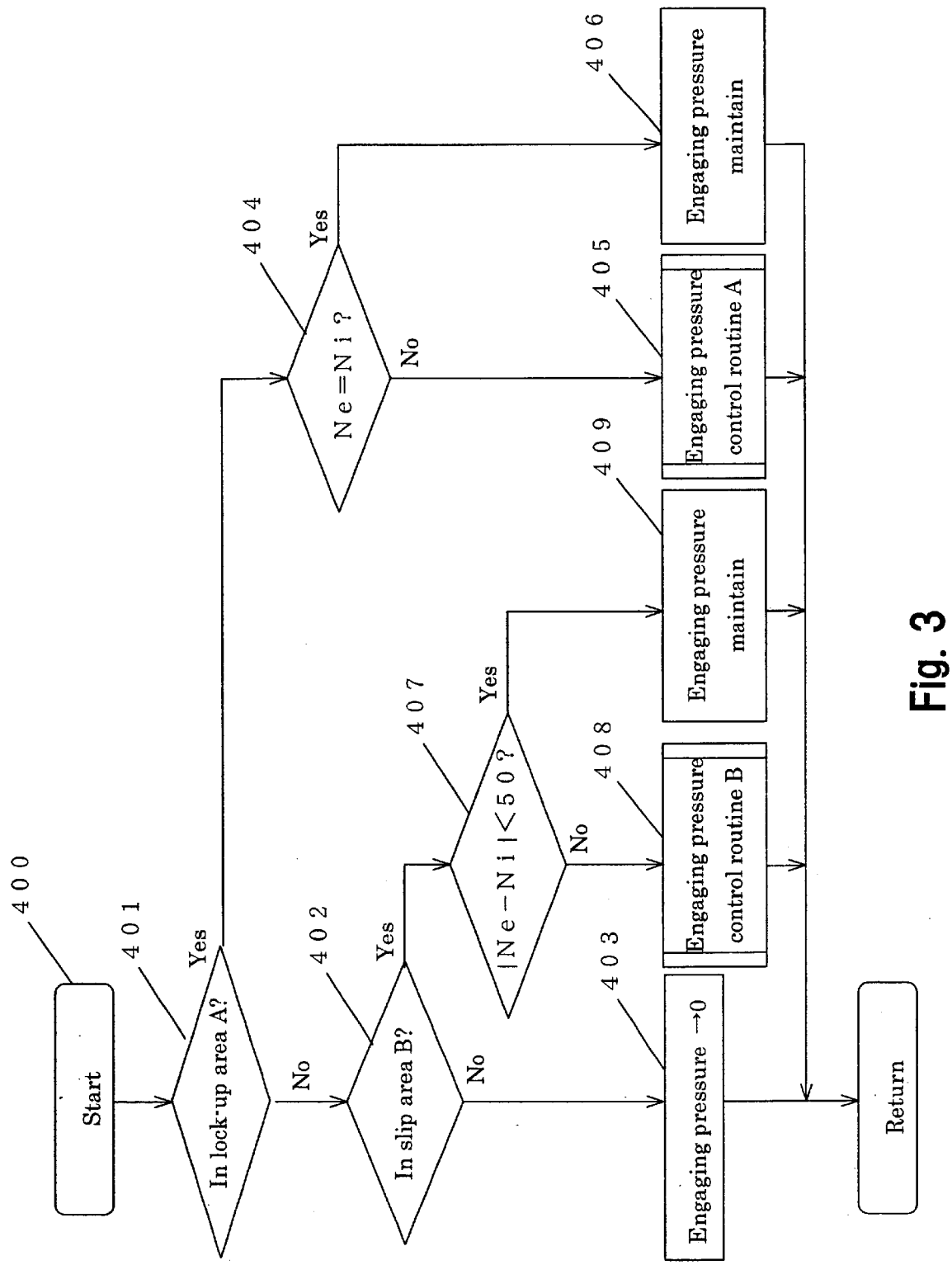
FIG. 3 is a flow-chart illustrating the operation of the control device.

With respect to the control of the lock-up mechanism, the program starts processing the routine shown in FIG. 3 from step 400, with the routine being carried out every predetermined time by the CPU 51. In step 401, the program judges whether or not a driving condition of the vehicle based on the stroke of the accelerator pedal 11 and the vehicle speed SPD is in a lock-up area A shown in FIG. 5.

Figure 5:
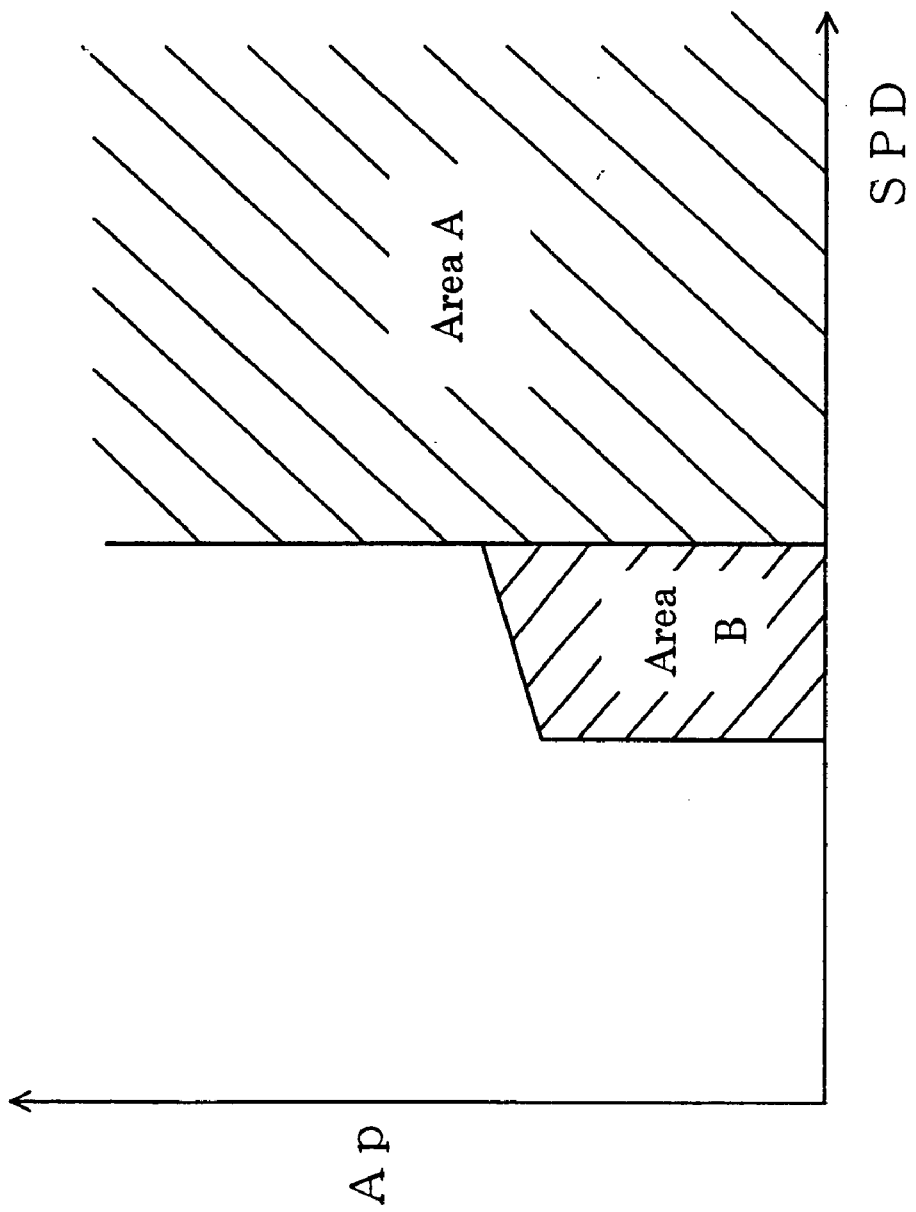
FIG. 5 is a graph showing the area of the lock-up mechanism.

The lock-up area A is an area representing a condition in which the rotation speed of the turbine impeller 22 is equal to that of the pump impeller 21 through complete engagement of the lock-up clutch 26 with the opposite portion 13a so as to reduce a torque transmitting loss by the hydraulic type torque transmitting mechanism. A slip area B shown in FIG. 5 represents a condition in which the rotation speed of the turbine impeller 22 is somewhat smaller (in this embodiment, 50 rpm) than that of the pump impeller 21 through engagement of the lock-up clutch 26 with the opposite portion 13a at a smaller hydraulic engaging pressure than the above completely engaged condition. Accordingly, in the slip area B, an inputted fluctuation when the engine 10 is driven at a low speed is absorbed while reducing the torque transmitting loss by the hydraulic type torque transmitting mechanism.

When the vehicle is not in the lock-up area A, the program proceeds to step 402 at which the program judges whether or not the driving condition of the vehicle is in the slip area B. When the vehicle is not in the slip area B, the program proceeds to step 403. At step 403, the hydraulic pressure Pon in the engaging side chamber R1 is drained by the operation of the third solenoid valve 43 and the hydraulic pressure Poff in the release side chamber R2 approaches the line pressure. That is, the engaging pressure loaded to the lock-up clutch 26 becomes zero, and the lock-up clutch 26 is in the disengaging condition. After that, one routine of the program is finished.

When it is determined in step 401 that the vehicle is in the lock-up area A, the program proceeds to step 404 where the program judges if the input shaft rotation speed Ni is equal to the engine rotation speed Ne. During the first time proceeding to step 404, the input shaft rotation speed Ni is different from the engine rotation speed Ne because the lock-up clutch 26 is not in the completely engaging condition. Next, the program proceeds to step 405 at which the program processes an engaging pressure control routine A described in more detail below. After that, one routine of the program is finished.

When it is determined at step 402 that the vehicle is in the slip area B, the program proceeds to step 407 where the program judges whether or not the absolute value of the difference between the input shaft rotation speed Ni and the engine rotation speed Ne is smaller than 50 rpm. During the first time proceeding to step 407, the absolute value of the difference between the input shaft rotation speed Ni and the engine rotation speed Ne is larger than 50 rpm because the lock-up clutch 26 does not reach the slip condition. Consequently, the program proceeds to step 408. Here, the program processes an engaging pressure control routine B described in more detail below. After that, one routine of the program is finished.

Thereafter, the CPU 51 processes this routine or program every predetermined time as mentioned above. Accordingly, when the driving condition of the vehicle is maintained in the lock-up area A or the slip area B, the program processes steps 405 or step 408. As a result, the engaging pressure is controlled until the difference between the input shaft rotation speed Ni and the engine rotation speed Ne is a target value.

After that, the lock-up clutch 26 is controlled to be a lock-up condition or a slip condition by the repeated processing of the above steps, and the program proceeds to step 406 or step 409. The engaging pressure is maintained to keep the hydraulic pressures Pon and Poff.

Referring to the flow chart shown in FIG. 4, set forth below is a description of the engaging pressure control routine A processed at step 405 and the engaging pressure control routine B processed at step 408. First, the program proceeds to step 501 at which the engaging pressure is increased slowly by operation of the third solenoid valve 43. The program then proceeds to step 502 where the program judges whether or not the actual slip value is equal to the intermediate slip value. During the first time of proceeding to step 502, the actual slip value is larger than the intermediate slip value. Accordingly, the program proceeds to step 501 again, and the engaging pressure is increased or becomes larger. When the actual slip value becomes equal to the intermediate slip value by the repeated processing of step 501 and step 502, the program proceeds to step 503.

At step 503, the program judges whether or not the intermediate slip value is equal to the target slip value. During the first time of proceeding to step 503, the intermediate slip value is larger than the target slip value and so the program proceeds to step 504. At step 504, the program renews the intermediate slip value to be close to the target slip value. The program processes step 501 and step 502 repeatedly until the actual slip value becomes equal to the target slip value. When the intermediate slip value becomes equal to the target slip value by the repeated processing of program steps 501 to 504, the program proceeds to step 505. At step 505, the hydraulic pressures Pon and Poff are maintained to keep the engaging pressure which achieves the intermediate slip value by controlling the operation of the third solenoid valve 43. In FIG. 4, the target slip value in case of the engaging pressure control routine A is the value shown in step 404 (i.e., Ni=Ne). The target slip value in case of the engaging pressure control routine B is the value shown in step 407 (i.e., the difference between the input shaft rotation speed Ni and the engine rotation speed Ne is less than 50 rpm). The intermediate slip value is set at the actual slip value side between the target slip value and the actual slip value. The predetermined value is determined from the map memorized in the CPU 51 based on the driving condition of the vehicle. The intermediate slip value closes to or approaches the target slip value in accordance with the actual slip value closing to or approaching the target slip value.

The CPU 51 includes various calculating mechanisms for carrying out the operation described above. A target slip value calculating means calculates the target slip value based on the driving condition of the vehicle, for example, the vehicle speed SPD, the signal Ap indicating the stroke of the accelerator pedal 11 and the engine rotation speed Ne. An actual slip value detecting means detects the actual slip value from the difference between the engine rotation speed Ne and the input shaft rotation speed Ni. An intermediate slip value setting means sets an intermediate slip value between the target slip value and the actual slip value, and an intermediate slip value renewal means reduces the intermediate slip value to a renewed value closer to the target slip value than the intermediate slip value when the actual slip value reaches the intermediate slip value. The CPU 51 and the third solenoid valve 43 also form a hydraulic pressure controlling means controlling the hydraulic pressure supplied to the lock-up mechanism in order for the actual slip value to coincide with the intermediate slip value.

Figure 4:
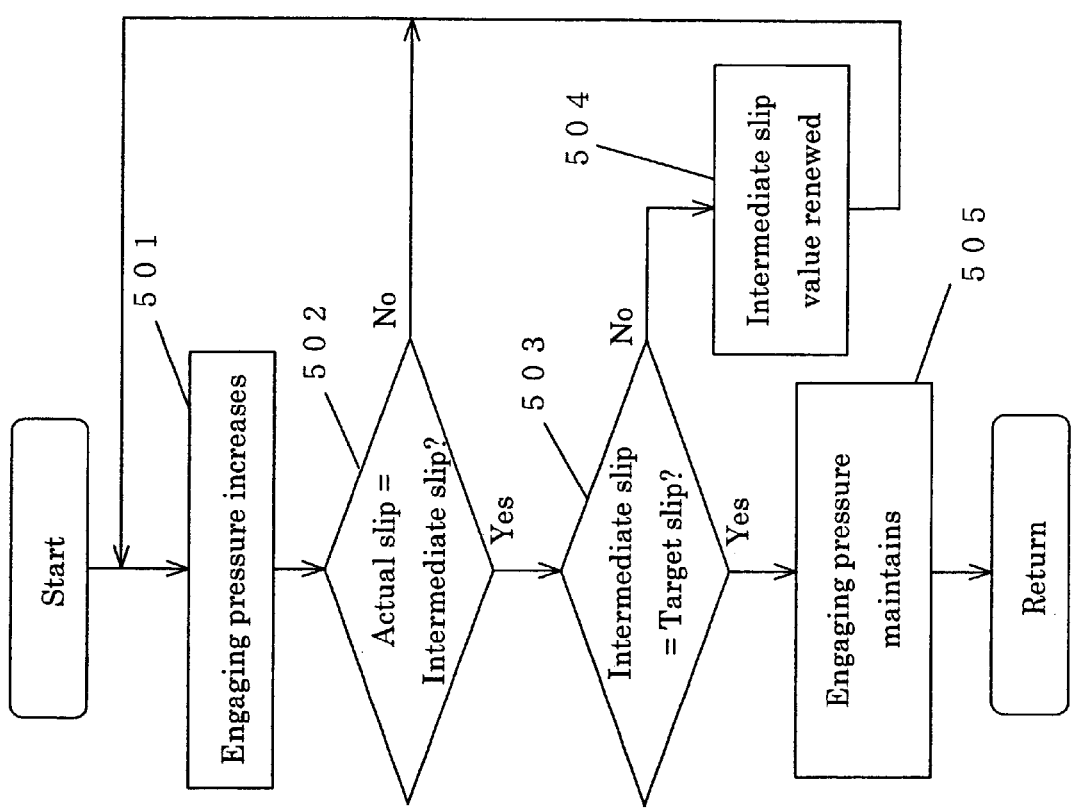
FIG. 4 is a flow-chart of a sub-routine of the operation shown in the flow-chart of FIG. 3.
Figure 6:
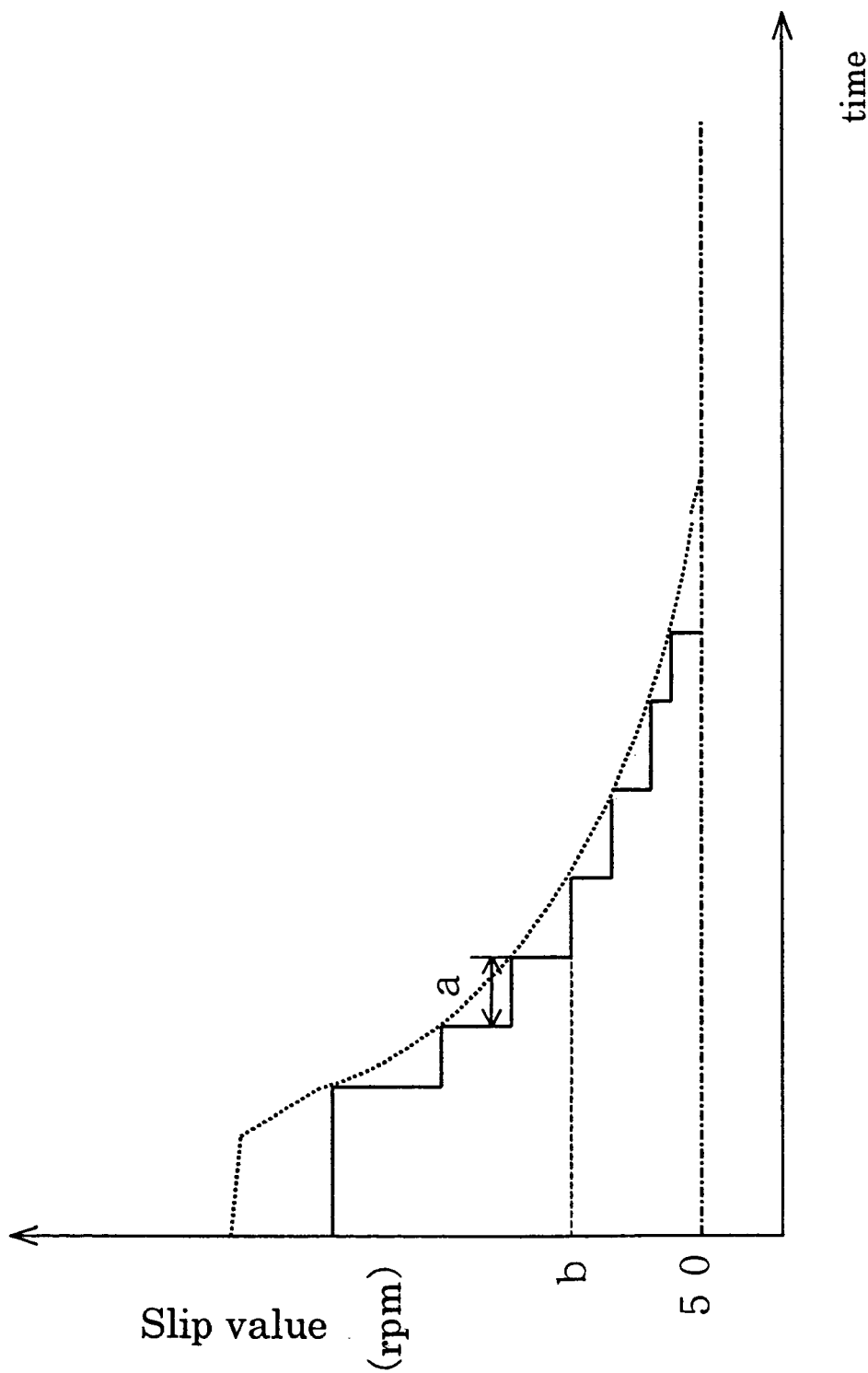
FIG. 6 is a timing chart of the control operation shown in FIG. 4.

FIG. 6 is a timing chart corresponding to the engaging pressure control routine B in FIG. 4. In FIG. 6, the vertical axis shows a difference between the rotation speed of the pump impeller 21 and the rotation speed of the turbine impeller 22, while the horizontal axis shows the progress time. The dotted line in FIG. 6 shows the actual slip value, the solid line shows the intermediate slip value, and the one-dot chain line shows the target slip value. The intermediate slip value is set with respect to the difference between the actual slip value and the target slip value. The intermediate slip value is renewed to be a value closer to the target slip value when the actual slip value reaches the intermediate slip value by increasing the engaging pressure. The engaging pressure is increased to approach the actual slip value to the renewed intermediate slip value. This operation is performed until the renewed intermediate slip value reaches the target slip value. A timing chart of the engaging pressure control routine A is omitted because the difference between the engaging pressure control routine A and the engaging pressure control routine B is only the target slip value. In this embodiment, the renewed intermediate slip value "b" is set based on a time "a" from when the intermediate slip value is renewed to the actual slip value reaches to the intermediate slip value. That is to say, the intermediate slip value renewal means adjusts the renewed intermediate slip value in response to a time until the actual slip value reaches the intermediate slip value after the intermediate slip value is renewed. In this way, it is possible to control the slip value to be appropriate with respect to the changing ratio of the engaging pressure.

According to the embodiment of the invention described above and illustrated in the drawing figures, the intermediate slip value is set between the actual slip value and the target slip value. Accordingly, the intermediate slip value is reliably set at a larger slip value than the target slip value. It is thus possible to control the slip value of the pump impeller and the turbine impeller without overshooting the actual slip value with respect to the target slip value.

Having now fully described the invention, it will be apparent to one of the ordinary skill in the art that a variety of changes and modifications can be made within the spirit and scope of the invention as described above. For example, it is possible to renew the intermediate slip value in spite of the time until the actual slip value approaches the intermediate slip value after the intermediate slip value is renewed.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A lock-up mechanism control device comprising:
    a lock-up mechanism arranged in parallel with a hydraulic torque transmitting mechanism transmitting a rotatory power of a pump impeller connected with an output shaft of an engine to a turbine impeller connected with a wheel side element, the lock-up mechanism controlling a slip value between a rotational speed of the pump impeller and a rotational speed of the turbine impeller in response to hydraulic pressure supplied to the lock-up mechanism;
    target slip value calculating means for calculating a target slip value which remains fixed to completion of control of the lock-up mechanism based on driving conditions of a vehicle;
    actual slip value detecting means for detecting an actual slip value from the difference between the rotational speed of the pump impeller and the rotational speed of the turbine impeller;
    intermediate slip value setting means for setting an intermediate slip value between the actual slip value and the target slip value;
    hydraulic pressure controlling means for controlling the hydraulic pressure supplied to the lock-up mechanism in order for the actual slip value to coincide with the intermediate slip value; and
    intermediate slip value renewal means for reducing the intermediate slip value to a renewed intermediate slip value closer to the target slip value than the intermediate slip value when the actual slip value reaches the intermediate slip value and for reducing the renewed intermediate slip value based on a time until the actual slip value reaches the renewed intermediate slip value after the intermediate slip value is renewed.

2. The control device of the lock-up mechanism according to claim 1, wherein the intermediate slip value renewal means renews the intermediate slip value until the intermediate slip value reaches the target slip value.

3. A method for controlling a lock-up mechanism arranged in parallel with a hydraulic torque transmitting mechanism that transmits rotatory power of a pump impeller connected with an output shaft of an engine to a turbine impeller connected with a wheel side element, with the lock-up mechanism controlling a slip value between a rotational speed of the pump impeller and a rotational speed of the turbine impeller in response to hydraulic pressure supplied to the lock-up mechanism, comprising:
    calculating a target slip value which remains fixed to completion of control of the lock-up mechanism based on driving conditions of a vehicle;
    detecting an actual slip value between the rotational speed of the pump impeller and the rotational speed of the turbine impeller based on the difference between the rotational speed of the pump impeller and the rotational speed of the turbine impeller;
    setting an intermediate slip value between the actual slip value and the target slip value;
    controlling hydraulic pressure supplied to the lock-up mechanism to cause the actual slip value to approach the intermediate slip value;
    reducing the intermediate slip value to a renewed value closer to the target slip value than the intermediate slip value when the actual slip value reaches the intermediate slip value; and
    repeatedly reducing the intermediate slip value to set the renewed value closer to the target slip value based on a time until the actual slip value reaches the renewed value after the renewed value is set.

4. The method according to claim 3, wherein the intermediate slip value is repeatedly renewed until the intermediate slip value equals the target slip value.

* * * * *